United States Patent [19]
Tsai et al.

[11] Patent Number: 5,784,178
[45] Date of Patent: Jul. 21, 1998

[54] HIGH PERFORMANCE CONTACT IMAGE SENSOR

[75] Inventors: Yong-Song Tsai; Sheng-Ti Lee; Chien-Chou Huang; Chien-I Fu, all of Taipei, Taiwan

[73] Assignee: Dyna Image Corporation, Hsin Tien, Taiwan

[21] Appl. No.: 611,472

[22] Filed: Mar. 6, 1996

[51] Int. Cl.$^6$ ........................................ H04N 1/04
[52] U.S. Cl. .................... 358/482; 358/483; 250/208.1
[58] Field of Search ........................ 358/482, 483, 358/474, 406; 250/208.1; H04N 1/04

[56] References Cited

U.S. PATENT DOCUMENTS

| | | | |
|---|---|---|---|
| 4,511,804 | 4/1985 | Ozawa | 250/578 |
| 4,831,454 | 5/1989 | Tamka et al. | 358/213.31 |
| 4,866,291 | 9/1989 | Shimada et al. | 250/578 |
| 5,214,272 | 5/1993 | Ueno | 250/208.1 |
| 5,408,113 | 4/1995 | Kanno et al. | 257/292 |
| 5,514,989 | 5/1996 | Sato et al. | 327/109 |

*Primary Examiner*—Thomas I. Stoll
*Attorney, Agent, or Firm*—Raymond Sun

[57] ABSTRACT

A contact image sensor is provided with a modified photodevice module and method of operation. The photodevice modules convert the video signals created by the sensed lights from an electrical charge to electrical voltage immediately upon stimulation of the photodevice, and hold the electrical voltage at another element in the photodevice module so that the voltage can be immediately output when the shift register output switch is turned on. A dark current elimination circuit is also provided and includes a light-shielded photodevice which produces a dark current reference signal representative of the expected dark current in the photodevices of the photodevice modules. This dark current reference signal is used to adjust the electrical charge created by the light stimulation of the photodevice.

26 Claims, 16 Drawing Sheets

HIGH PERFORMANCE CONTACT IMAGE SENSOR

BACKGROUND OF THE INVENTION

1. Field of the Invention

The present invention relates to contact image sensors, and in particular, to contact image sensors having photosensor or photodevice modules which immediately convert electrical charges generated by the photodevice to an electrical voltage which can be output quickly when the particular photodevice module is turned on, and includes a circuit for eliminating dark current, to improve the quality of the image signals reproduced by the image sensor.

2. Description of the Related Art

Contact image sensors (abbreviated CIS) are devices that sense light signals representing text, images and data, and transfer them into readable electrical signals. CIS are currently being used in connection with optical devices such as scanners, facsimile machines, and copiers.

FIG. 1 is a cross-sectional view of a conventional CIS module 20. The module 20 comprises a conventional aluminum case 22 which houses a rod lens array 24. A PCB board 26 is fitted at the bottom of the aluminum case 22 and has a row of contact image sensors 28 provided thereon. A light source 30, such as a cold cathode fluorescent lamp or an LED array, is positioned in the module 20 in spaced-apart manner from the aluminum case 22 and a glass 32. The light source 30 is adapted to emit light at the glass 32 to reflect the image presented on a document 34 towards the rod lens array 24 for input by the row of contact image sensors 28. The CIS then sends out the sensed light signals in the form of electrical signals.

Let us take an A4 CIS module with 200 dpi (dots per inch) as an example. 200 dots (or pixels) per inch is equal to about 80 dots per centimeter. The width of an A4 size paper is about 21.6 cm, so that a CIS module will need 80 dots/cm ×21.6 cm, or 1728 pixels, to sense a line of image on an A4 size paper with a 200 dpi resolution requirement. In addition, CIS modules are usually divided into a plurality of chips each having the same structure and function. For example, FIG. 2 illustrates a CIS module having a plurality of L chips, with all chips providing a total of 1728 photosensing elements, each corresponding to one pixel. In FIG. 2, CLOCK is the external working clock signal, SI is the external starting signal used to turn on this specific CIS module, and EOP is the ending signal for a chip which is also used as the starting signal SI for the next chip. Applications for CIS with different resolution and paper size requirements are calculated using the same principles described above.

FIG. 3 illustrates the various components of a conventional CIS chip. The CIS chip has an array of photosensing elements or photodevices, such as phototransistors or photodiodes 36. Each photodevice 36 detects the reflected light signals from the image and accumulates electrical charges corresponding to the intensity of the light received. The CIS chip also has an array of shift register output switches 38 for each photodevice 36 to control whether to output the accumulated electrical charges from the particular photodevice. A clock buffer 40 accepts the external CLOCK signals and provides the necessary clock (CLK) and reset (RST) signals to the chip. A starting signal buffer 42 accepts the external starting signal SI, or the ending signal EOP from the previous chip, and provides this signal to this chip as its starting signal (SI). A shift register array 44 accepts the starting signal SI and the clock signals CLK and sequentially controls the switching on and off of the switches 38 to sequentially output the electrical charges accumulated in the corresponding photodevices 36 according to the relative positions of the pixels. An ending signal buffer 46 accepts the output of the last shift register of the shift register array 44 and transmits an ending signal EOP which is used to terminate the chip select signal CS and which is also transmitted to the next chip as a starting signal SI. A chip select controller 48 generates a chip select signal CS based on the clock signals CLK, the starting signal SI and the ending signal EOP, to determine whether this chip should be activated or not. An output controller 50 receives the electrical charges from the photodevices 36 as video signals, and these signals are outputted depending upon the chip select signal CS. The reset signal RST is used to reset video signals to zero so as to be ready to receive the next video signal.

The operation of the CIS module is now described with reference to the timing diagram of FIG. 4. When the starting signal SI(1) is transmitted to the first chip, the chip select signal CS(1) goes high and activates the first chip. The accumulated charges (video signals) inside the photodevices 36 of the first chip are then sequentially output as video signal OS(1). After all video signals of the photodevices 36 in the first chip have been output, the ending signal EOP(1) turns off the chip select signal CS(1) to turn off the first chip. EOP(1) is transmitted as a starting signal SI(2) to the second chip to cause video signals OS(2) to be output. This is repeated for all chips. When the video signals OS(L) of the last chip L have been outputted, a new starting signal will be transmitted to the first chip to begin a new cycle of video signal output.

FIG. 5 illustrates how the photodevices 36 process light signals which are received. Each photodevice 36, also symbolized by photodevice RM, is stimulated by light signals to produce electrical charges and accumulates these charges in the capacitor $C_{BC}$ at the P-N junction. After the corresponding shift register signal turns on the shift register output switch GM for this photodevice, the electrical charges accumulated in the capacitor $C_{BC}$ are then transferred in the form of electrical current $I_v$ and output to the video lines. Through the control of the chip select signal CS, the currents are charged to the capacitor CL located on the PCB circuit, which creates a corresponding voltage V(OS) at the terminal 54. This voltage signal is amplified and output as $V_R$ by the operational amplifier 52.

Referring also to the timing diagram of FIG. 6, when the shift register array 60 receives the starting signal SIOUT, the first shift register outputs a signal which turns on the switch G1 of the first photodevice 36 or R1, thereby causing the electrical charges accumulated in the photodevice to be output to the video line. The reset signal RST then turns on the switch SWQ1 to reset the signals on the video line. The second shift register then turns on the switch G2 of the second photodevice, thereby causing the electrical charges accumulated in that photodevice to be output to the video line. This process is repeated for all the photodevices of this chip. The chip select signal CS now turns off the switch SWQ2, ending one reading cycle of signal transmission for this chip and starting the reading cycle of the next chip.

In the conventional CIS, the photodevices sense the light to generate electron hole pairs and accumulate them in the form of electrical charges. The accumulated electrical charges are only output when the corresponding shift register turns on the corresponding switch GS to output the accumulated charges to the capacitor CL where they are then output in the form of electrical voltage. However, the reading time (i.e., time which the photodevice can transfer its stored charge through the switch GS to the video line) of a photodevice is very short. Assuming a working frequency of 500 KHz, for example, the reading time is about 2 microseconds. However, for a photodevice such as a phototransistor, the entire accumulated electrical charge (Q) cannot be outputted within this short reading time if too much charge is accumulated or if the working frequency increases. In such a situation, some electrical charge will remain in the photodevice and will be added to the electrical charges produced by the next light stimulation. Therefore, the output of electrical charge will be smaller than it actually should be, and there will be an error associated with the next output of this pixel. This is sometimes referred to as "image lag".

Dark current is another problem experienced by conventional CIS photodevices. Due to current leakage at the P-N junctions of the photodevices RM, each photodevice RM will output a certain amount of current even if it is not exposed to light. This current is called dark current. Dark current influences the dynamic range of a CIS' output and results in inaccurate signals. Current CIS designs attempt to compensate for the existence of dark current, but are not directed to the elimination or minimization of the source of dark current.

Thus, there is a need for a contact image sensor that has improved signal sensitivity and working frequency, which minimizes image lag, which minimizes the effect of dark current, and which produces video signals that accurately correspond to the reflected image.

SUMMARY OF THE INVENTION

The objects of the present invention may be achieved by providing a contact image sensor with a modified photodevice module and method of operation. The photodevice modules according to the present invention convert the video signals created by the sensed lights from electrical charge to electrical voltage immediately upon stimulation of the photodevice, and hold the electrical voltage at another element in the photodevice module so that the voltage can be immediately output when the shift register output switch is turned on.

The contact image sensor device according to the present invention includes a plurality of photodevice modules, a video line and a shift register array adapted to generate a shift register output signal to turn on the photodevice modules in a sequential manner to allow for transmission of video signals therefrom to the video line. Each photodevice module includes a photodevice, which can be either a phototransistor or photodiode, a voltage terminal and a shift register output switch. Light having a level of intensity is directed to the photodevice of each photodevice modules to generate an electrical charge that is representative of the level of intensity of the light received by the photodevice. The electrical charge is converted to an electrical voltage which is held at the voltage terminal. The shift register output signal is generated to sequentially turn on the photodevice modules to cause the electrical voltage held at the voltage terminal of each photodevice module to be immediately transmitted to the video line, thereby avoiding the problems associated with the reading time of conventional CIS photodevices. After the electrical voltage representing the video signal has been transmitted, the voltage terminal is reset by turning on a reset switch which is coupled to the voltage terminal.

In certain embodiments according to the present invention, the voltage terminal is biased to a bias voltage. In addition, a DC bias reference circuit generates a reference voltage corresponding to the bias voltage.

In a first embodiment according to the present invention, the photodevice module further includes a current mirror circuit coupled to the photodevice and the voltage terminal, a voltage source providing a bias voltage, and a capacitor having a first end coupled to the voltage source and a second end forming the voltage terminal, so that the voltage level at the voltage terminal corresponds to the bias voltage reduced by the electrical charge drawn by the current mirror circuit (the current drawn by the current mirror circuit corresponds to the electrical current generated by the photodevice). An output circuit is provided to receive the reference voltage and video signals, and to generate an output signal which is provided by subtracting the video signal from the reference voltage.

In a second embodiment according to the present invention, the photodevice module further includes a capacitor coupled to the voltage terminal and to the reset switch, and a source for providing a bias voltage, so that the voltage level at the voltage terminal corresponds to the bias voltage plus the voltage induced across the capacitor. An output circuit is provided to receive the reference voltage and video signals, and to generate an output signal which is provided by subtracting the reference voltage from the video signal.

The contact image sensor according to the present invention further provides a dark current elimination circuit having a light-shielded photodevice which produces a dark current reference signal representative of the expected dark current experienced by the photodevices of the photodevice modules. A current mirror circuit is coupled to the light-shielded photodevice and the photodevices of the photodevice modules for removing electrical current from the electrical charge generated by these photodevices that corresponds to the dark current reference signal.

Thus, the contact image sensor according to the present invention provides photodevice modules which immediately convert the electrical charge created by light stimulation into electrical voltage and holds the voltage at a terminal of a capacitor within the photodevice module. As a result, when the shift register output signal turns on the shift register output switch, the video signal held at the terminal in the form of electrical voltage is immediately output to the video lines. This avoids the problems caused by the time needed to convert electrical charges during the reading time. In addition, a dark current elimination circuit having a light-shielded photodevice produces a dark current reference signal which is used to adjust the electrical charge created by the photodevice. As a result, the photodevice modules of the present invention provide improved frequency response and more accurate output video signals, while minimizing image lag and the effect of dark current.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention modifies the conventional design of photodevices and uses a different method of transmitting signals to overcome the problems described hereinabove. The photodevice modules according to the present invention convert the video signals created by the sensed light from electrical charge to electrical voltage immediately upon stimulation of the photodevice, and hold the electrical voltage at another element in the photodevice module so that the voltage can be immediately output when the shift register output switch is turned on. This overcomes the problems associated with transferring electrical charge during the reading time, thereby improving the quality of the video signal and the working frequency, and minimizing image lag. In addition, a dark current elimination circuit may be provided to create a dark current reference signal that is used to adjust the electrical charges output by the photodevice.

Figure 7:
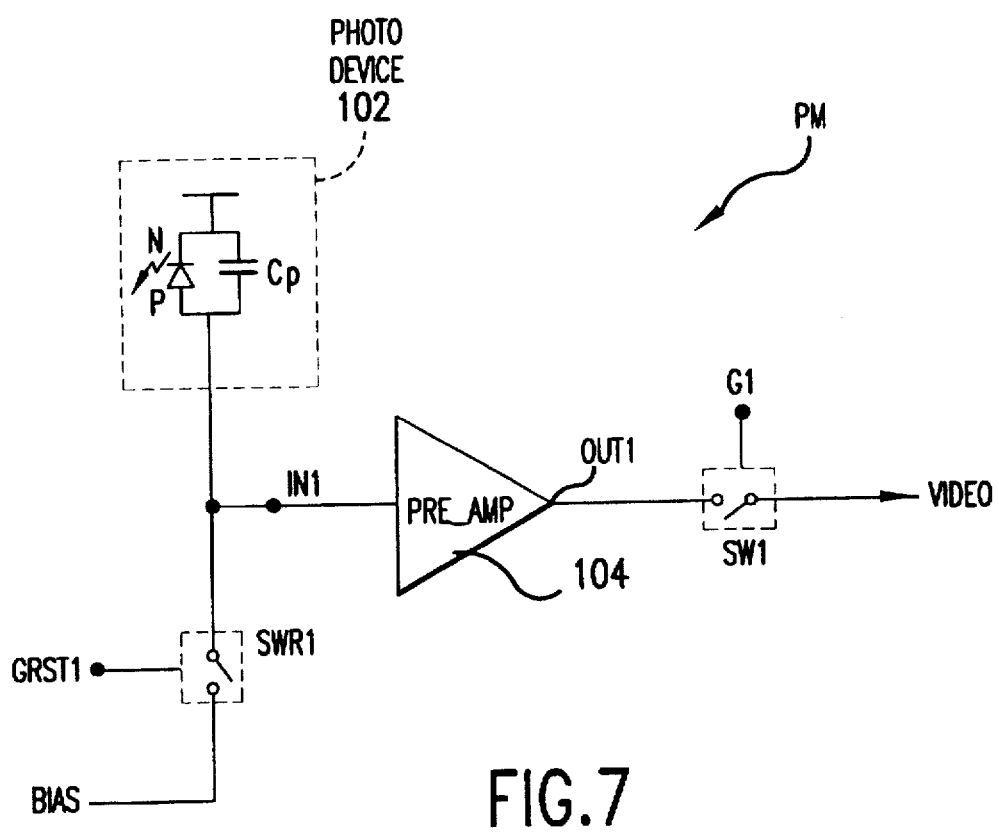
FIG. 7 is a circuit diagram of a first embodiment of a photodevice module according to the present invention.

The first embodiment of a photodevice module PM according to the present invention is illustrated in FIG. 7. The photodevice shown in dotted box 102 is a photodiode. The photodiode 102 includes a sensing component represented by a P-N junction and its junction capacitor $C_p$. Electrical charges created by light stimulation are held at the junction capacitor $C_P$ which causes the relative voltage at terminal IN1 to change. The voltage changes are then amplified by the pre-amplifier 104 and held at the terminal OUT1. When the shift register output signal G1 turns on the photodevice switch SW1, the video signal held at OUT1 in the form of electrical voltage is immediately output. During the time when the signal G1 is high, output signal GRST1 turns on reset switch SWR1 to reset the signal at the terminal IN1 for use with the next signal. Providing the pre-amplifier 104 in the photodevice module PM increases signal sensitivity and improves the signal-to-noise ratio.

Figure 1:
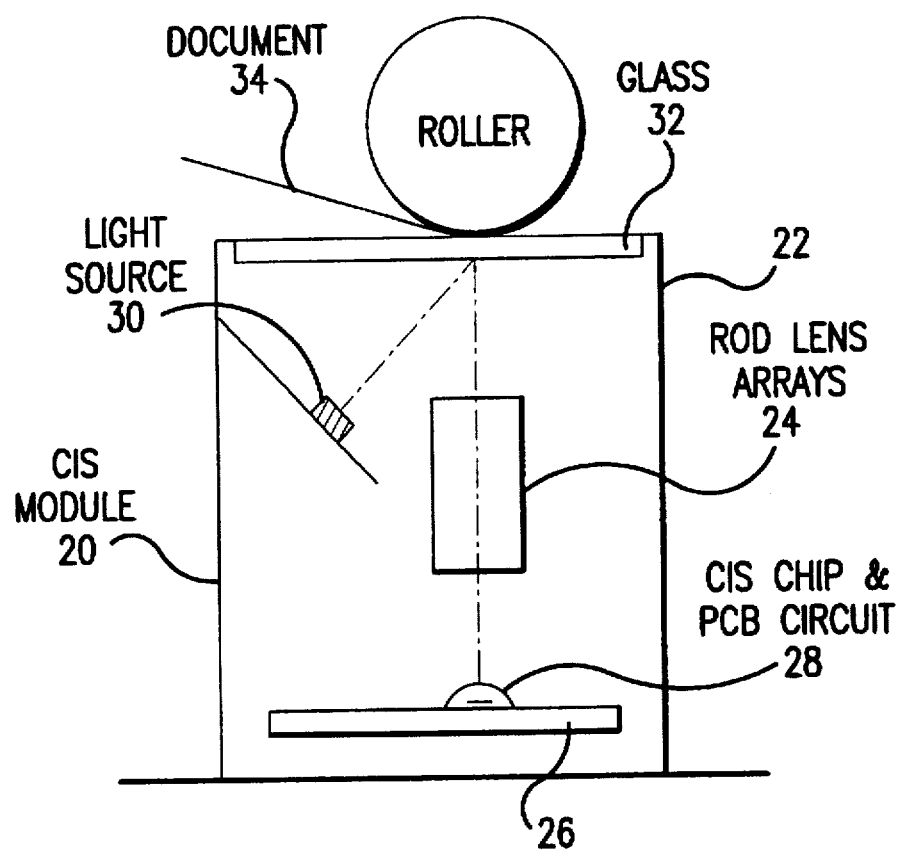
FIG. 1 is a cross-sectional view of a conventional contact image sensor module.
Figure 2:
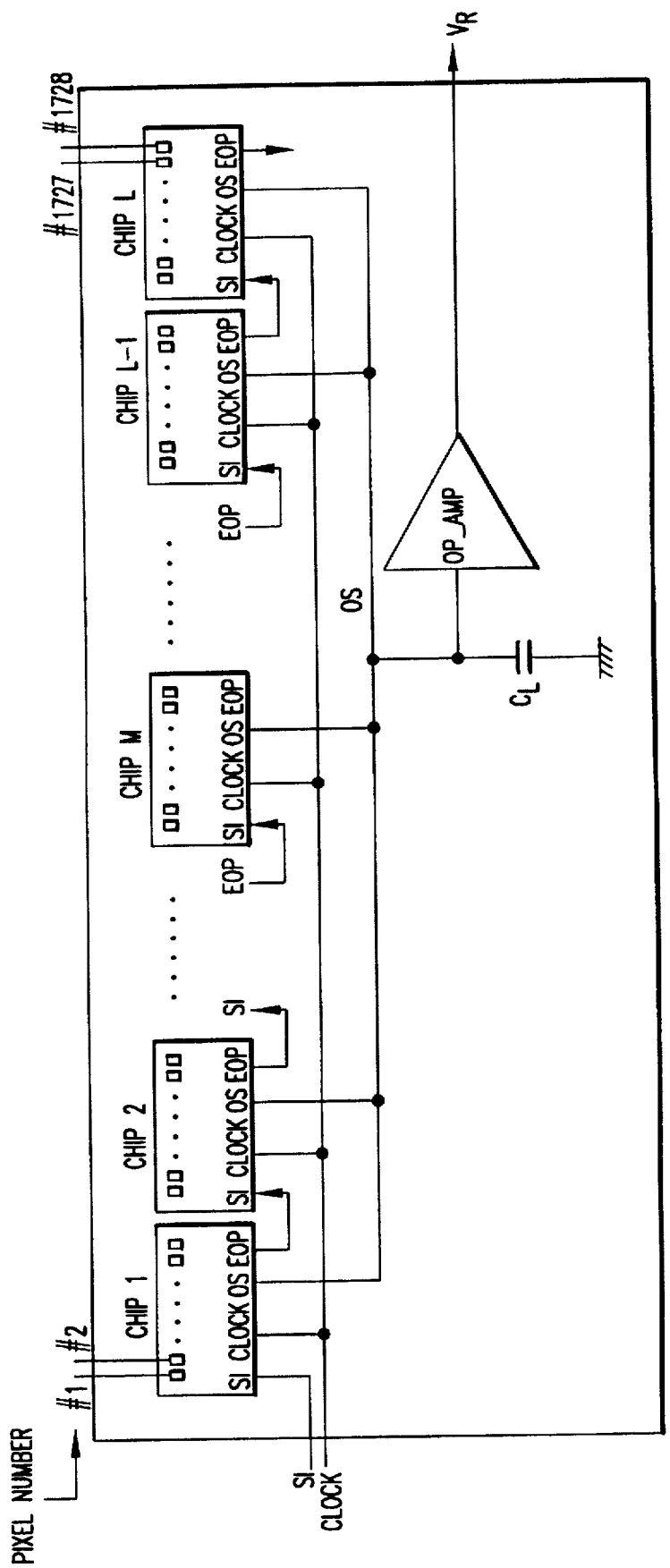
FIG. 2 is a block circuit diagram of the PCB board and contact image sensors of the conventional contact image sensor module of FIG. 1.
Figure 3:
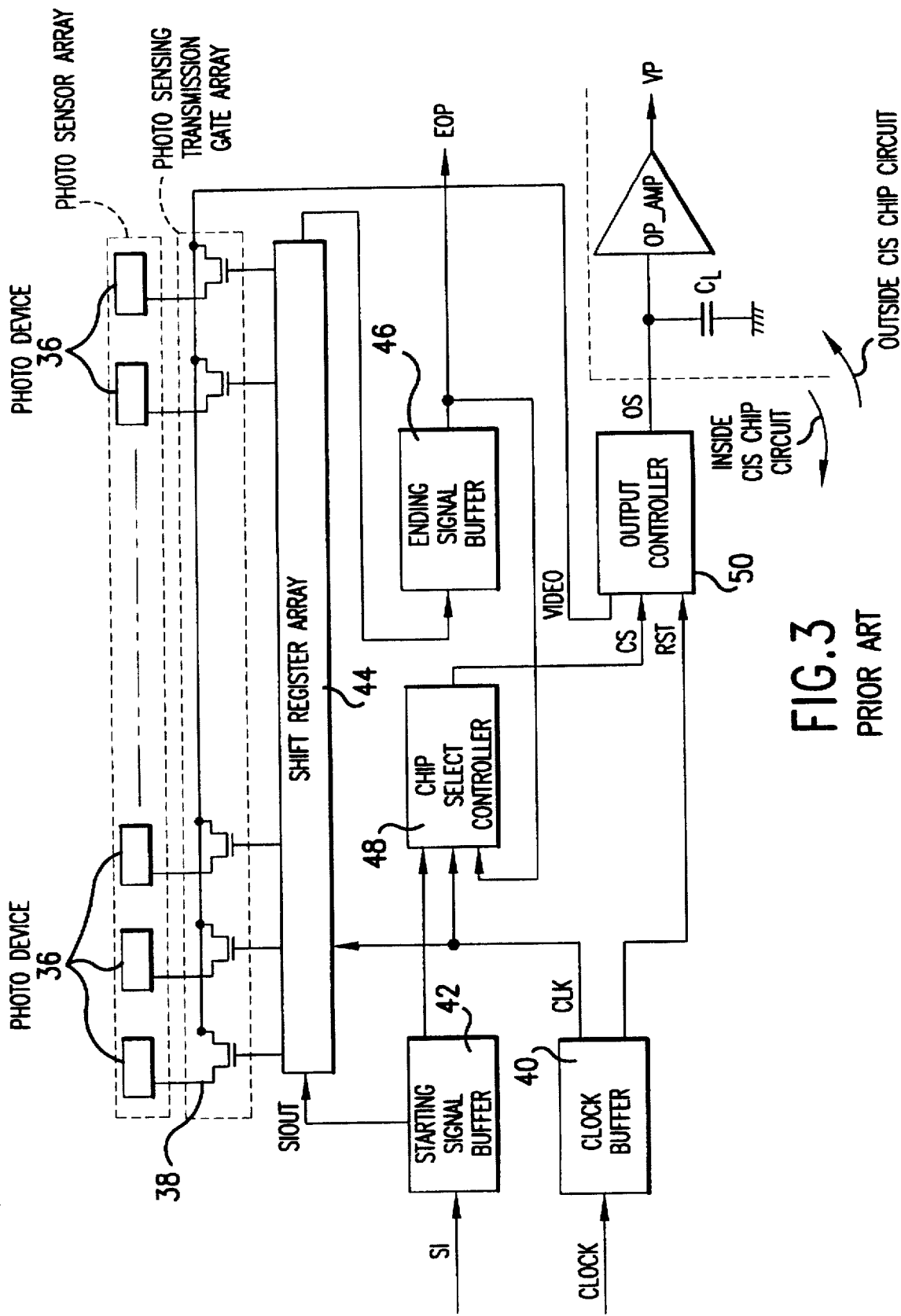
FIG. 3 is a block circuit diagram of a chip of the conventional contact image sensor module of FIG. 2.
Figure 4:
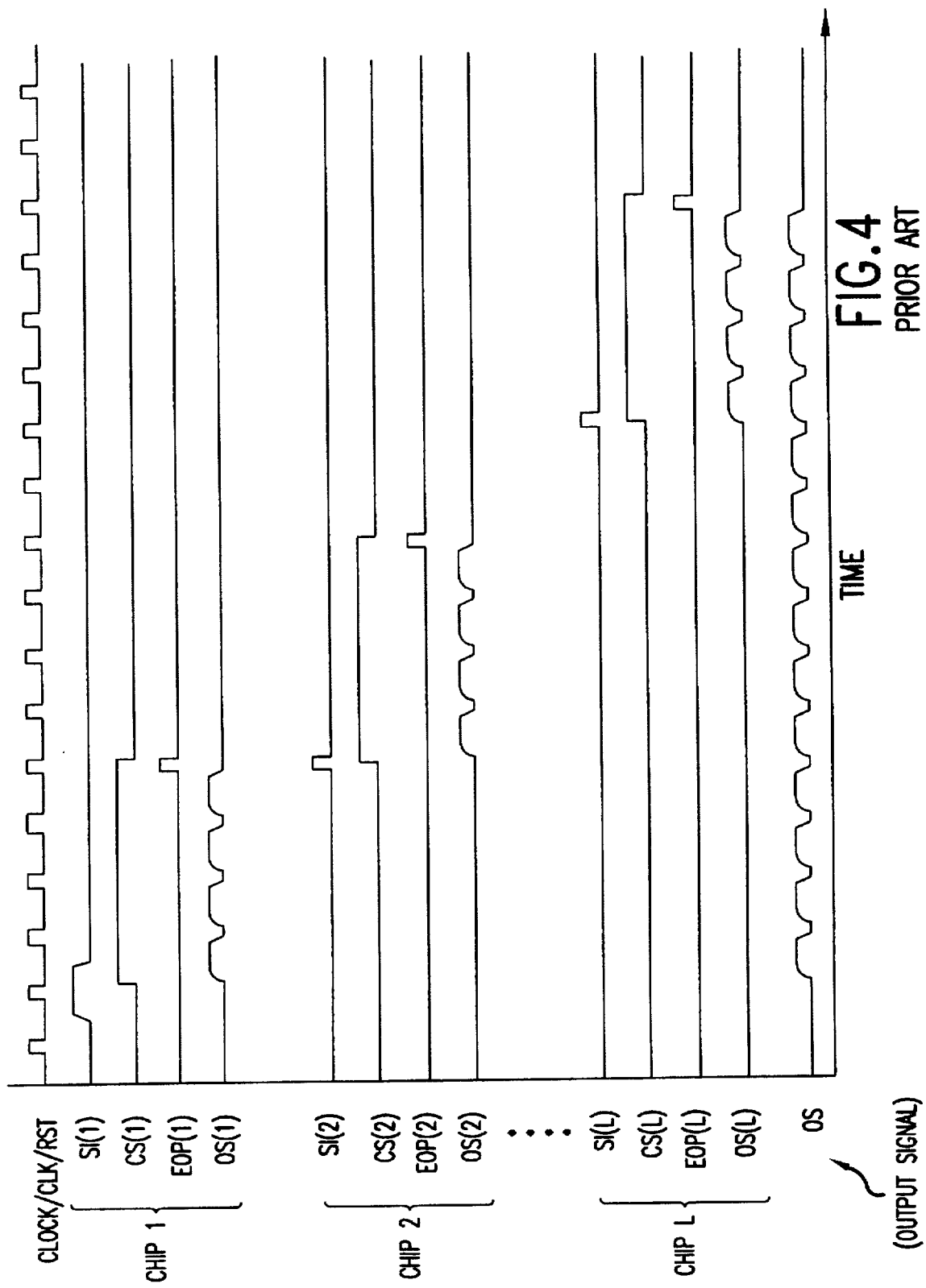
FIG. 4 is a timing diagram illustrating the operation of the conventional contact image sensor of FIGS. 1–3.
Figure 5:
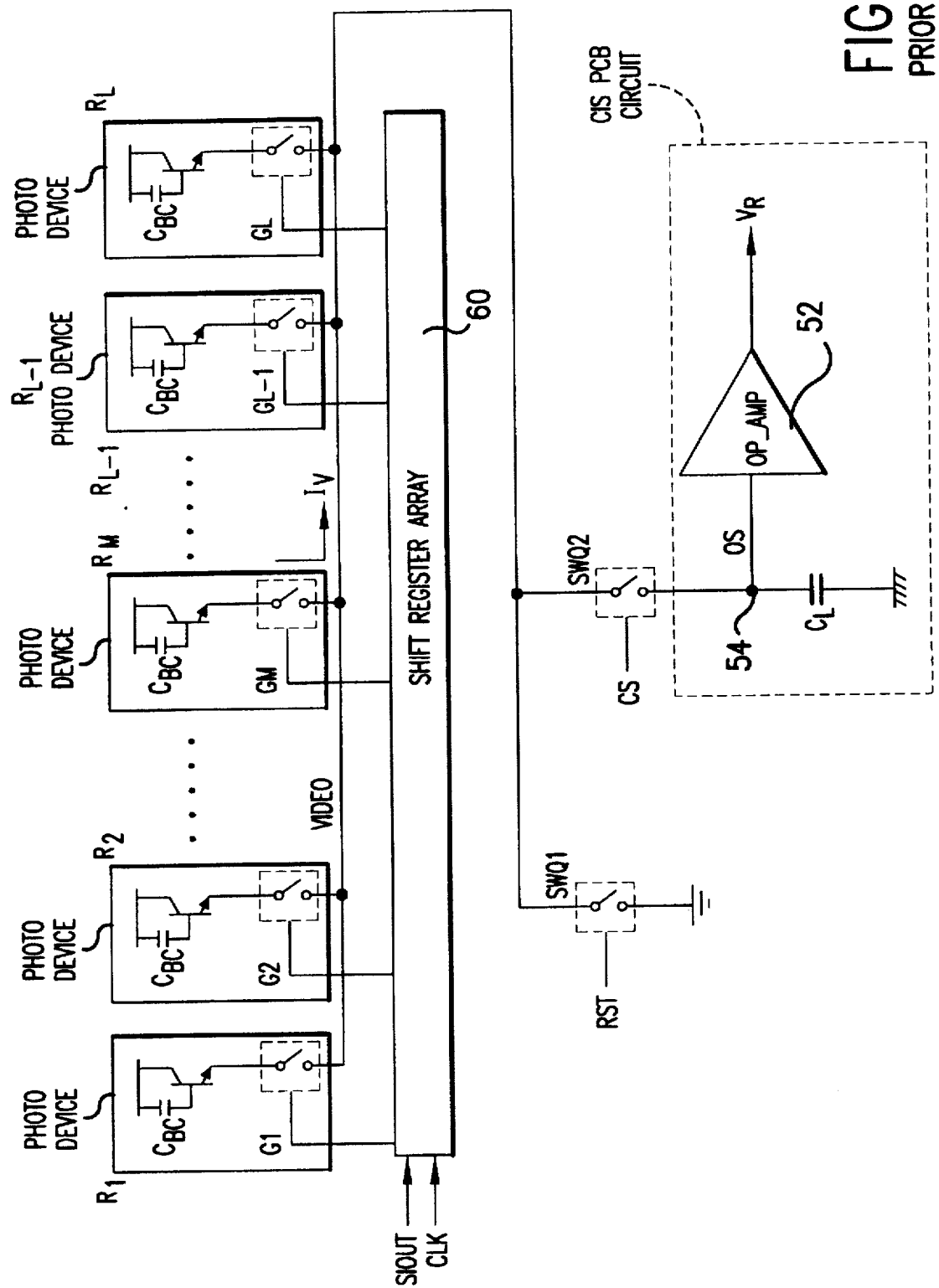
FIG. 5 is a partial block circuit diagram illustrating portions of the block circuit diagram of FIG. 3.
Figure 6:
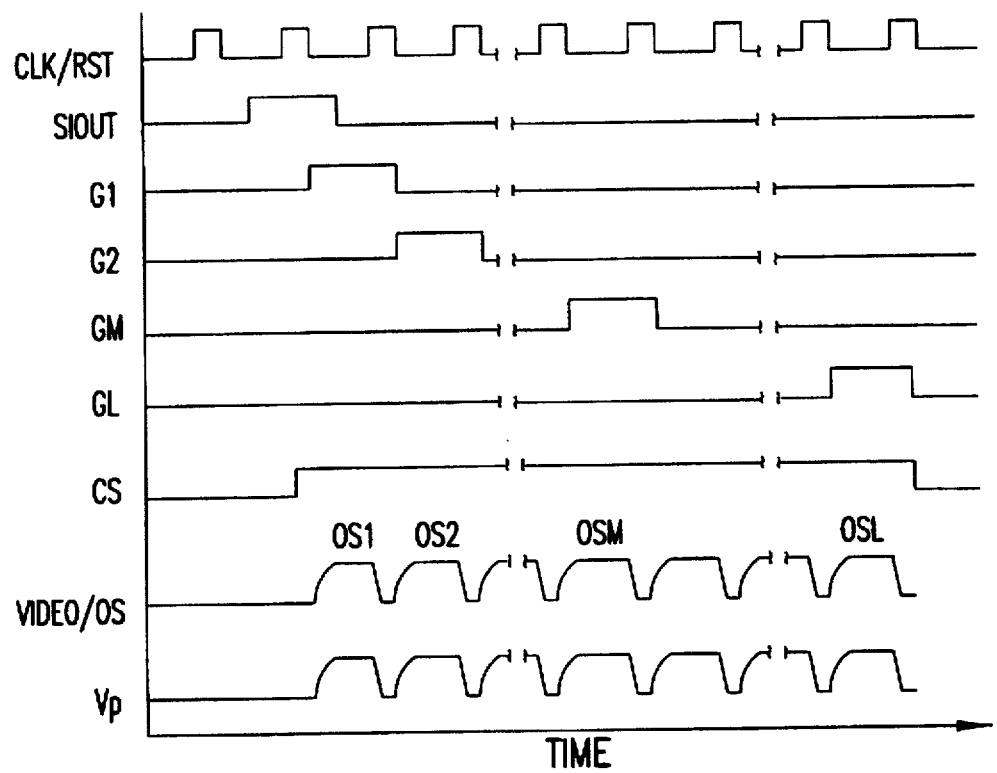
FIG. 6 is a timing diagram illustrating the operation of the conventional contact image sensor of FIG. 5.
Figure 8:
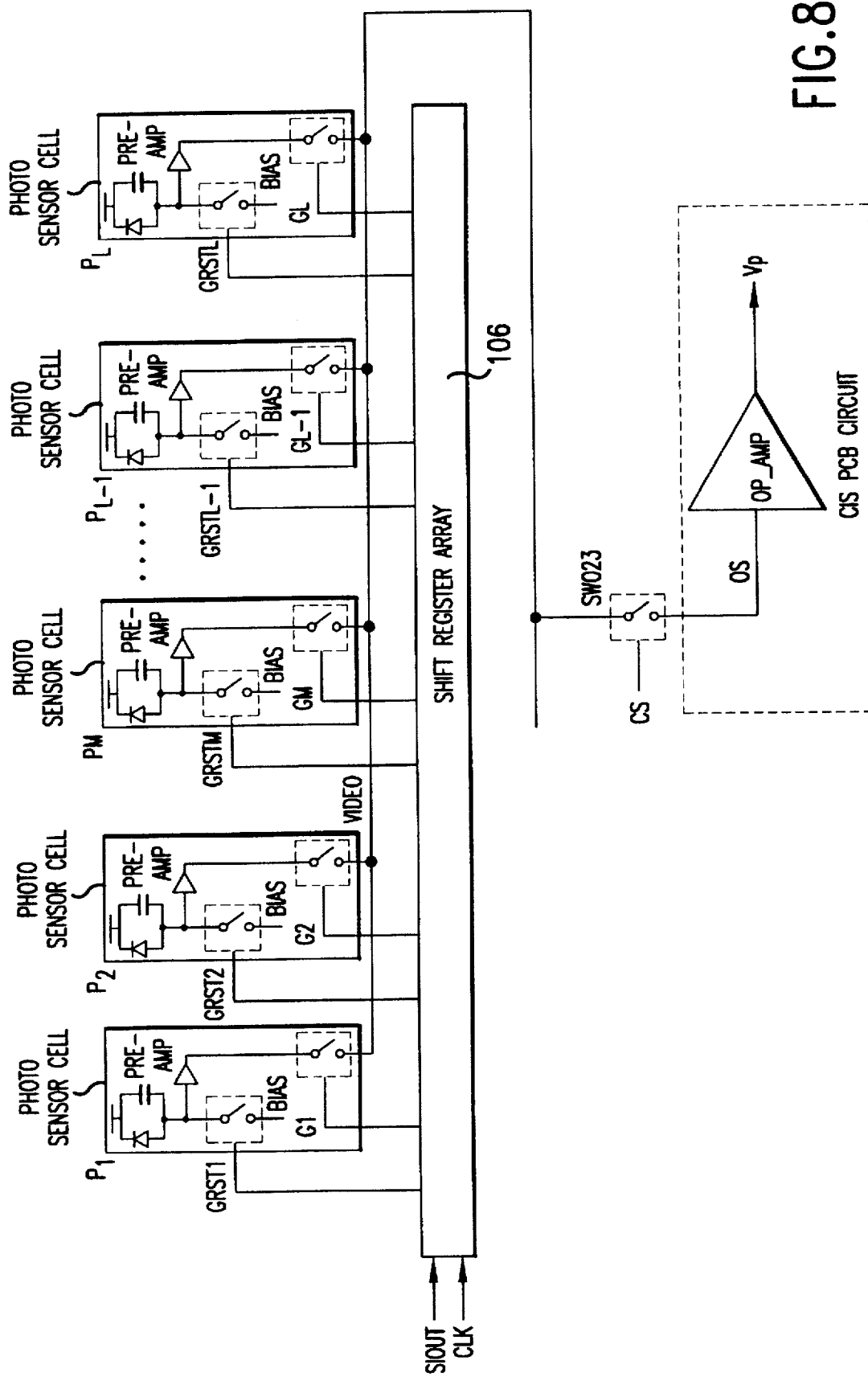
FIG. 8 is a block circuit diagram of a contact image sensor chip including a plurality of the photodevice modules of FIG. 7.
Figure 9:
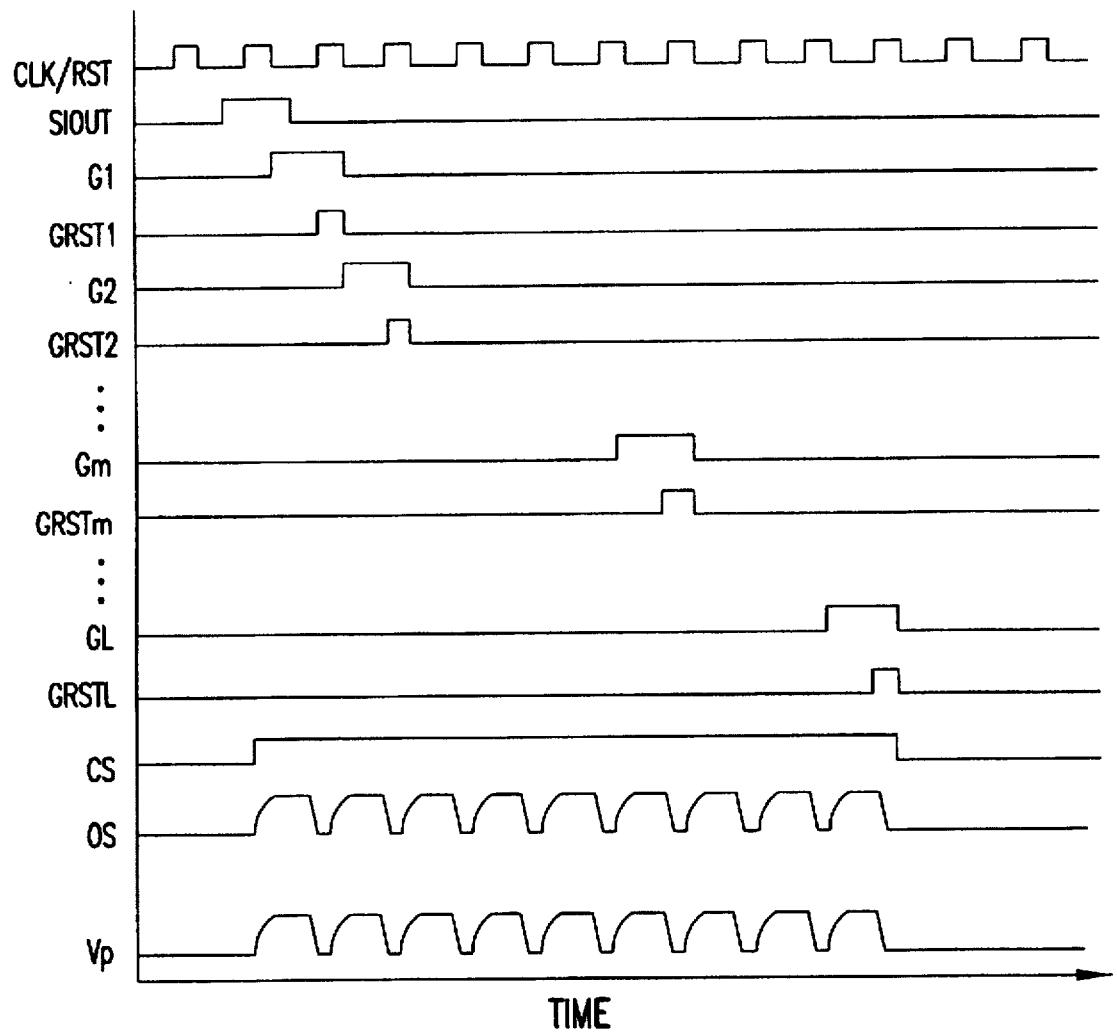
FIG. 9 is a timing diagram illustrating the operation of a contact image sensor utilizing the chip of FIG. 8.

FIG. 8 is a block circuit diagram illustrating how the photodevice modules PM of FIG. 7 combine to read or process light signals which are received. The block circuit diagram of FIG. 8 and its operation are similar to those for the conventional CIS shown in FIG. 5, except for two differences. First, the block circuit diagram of FIG. 8 does not provide a capacitor in the CIS PCB circuit. Second, reset switches GRST are connected to each photodevice module PM to reset the signal at the terminal IN1 for use with the next signal. The timing diagram for the block circuit diagram of FIG. 8 is illustrated in FIG. 9.

Figure 10:
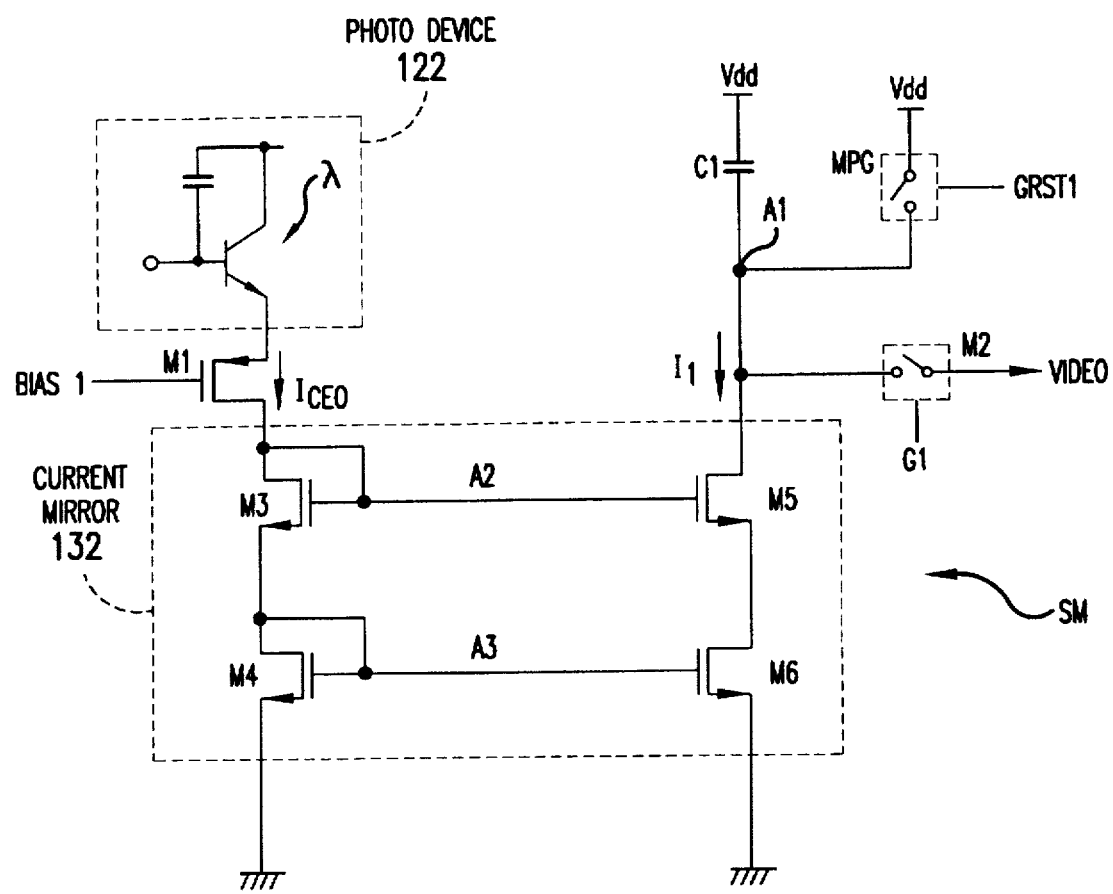
FIG. 10 is a block circuit diagram of a second embodiment of a photodevice module according to the present invention.

The second embodiment of a photodevice module SM according to the present invention is illustrated in FIG. 10. The photodevice shown in the dotted box 122 is a phototransistor. Electrical charges created by light stimulation take the form of electrical current $I_{CEO}$ which constantly flows through MOSFET device or transmission gate M1 MOSFET device or transmission gate M1 is constantly biased by "bias 1". MOSFET devices M3, M4, M5 and M6 define a current mirror 132, so that the current $I_{CEO}$ flowing through MOSFET devices M3 and M4 will be amplified to a current I1 charged to capacitor C1. This amplification of $I_{CEO}$ improves the sensitivity of the resulting video signal. Since one end of the capacitor C1 is biased by $V_{DD}$, the voltage V(VIDEO) at the terminal A1 of the capacitor C1 will actually decrease from the level of $V_{DD}$. In other words, the voltage V(VIDEO) is the amount of decrease calculated from $V_{DD}$. This arrangement of the capacitor C1 provides a stable bias for signals to be output to the output stage without the need for additional bias circuits.

When the shift register output signal G1 turns on the photodevice switch M2, the video signal held at terminal A1 in the form of electrical voltage V(VIDEO) is immediately output to the video lines. During the time when the signal G1 is high, output signal GRST1 turns on reset switch MPG to reset the signal at both ends of the capacitor C1, including the terminal A1, to $V_{DD}$ for use with the next signal.

Figure 11:
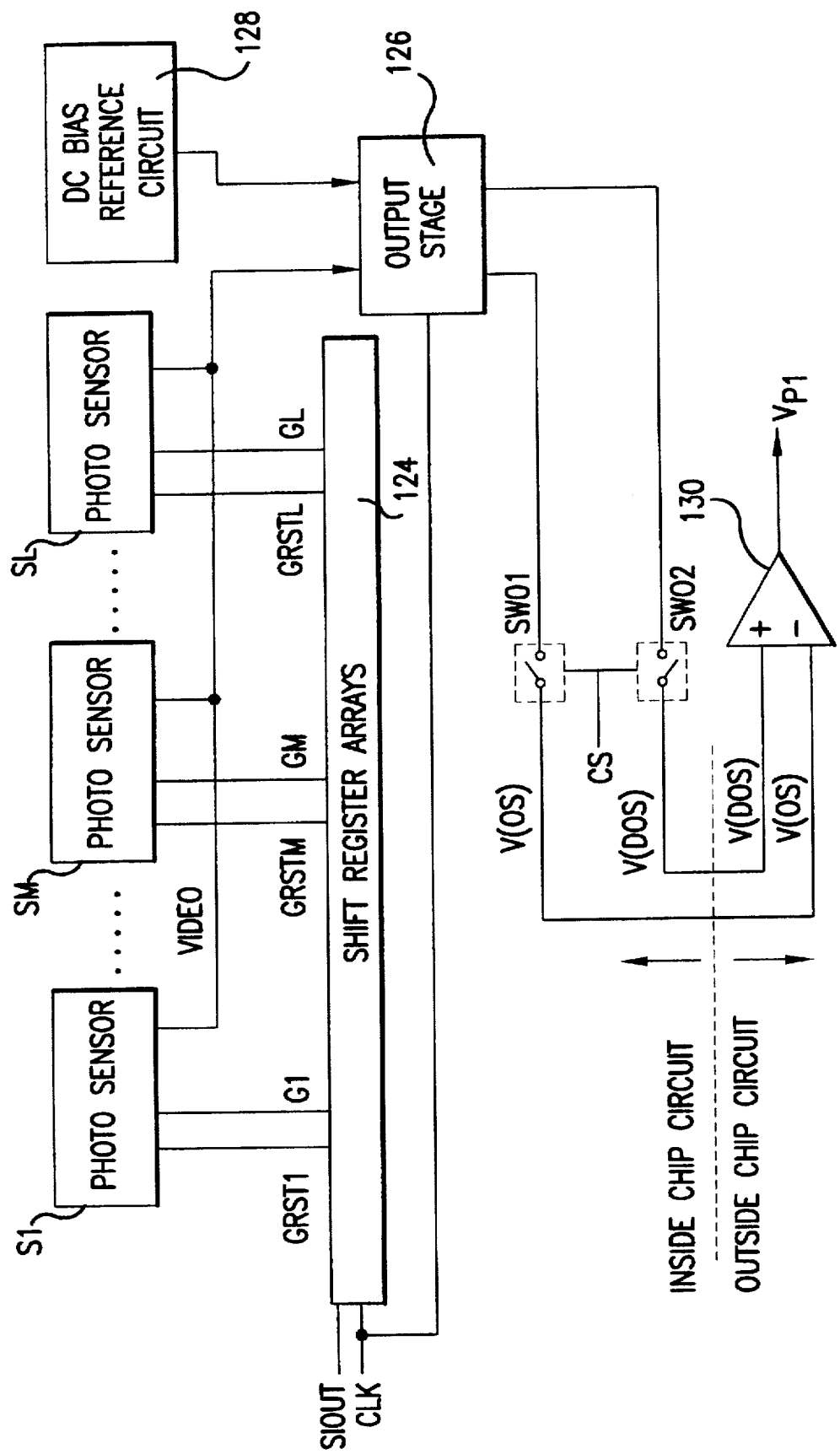
FIG. 11 is a block circuit diagram of a contact image sensor chip including a plurality of the photodevice modules of FIG. 10.

FIG. 11 is the block circuit diagram illustrating how the photodevice modules SM of FIG. 10 combine to read or process light signals which are received. The shift register array 124 sequentially outputs signals G1, G2, . . . , GM, . . . , GL to sequentially turn on switches M2 in the photodevice modules S1, S2, . . . , SM, . . . , SL, thereby sequentially outputting the voltage V(VIDEO) held at terminal A1 of capacitor C1 in these photodevice modules S1, S2, . . . , SM, . . . , SL on to the video line to the output stage 126 as the output signal V(OS). A DC bias reference circuit 128 is also connected to the output stage 126 to provide a reference signal V(DOS) that is of the same level as the reset level of signal V(OS).

Figure 12:
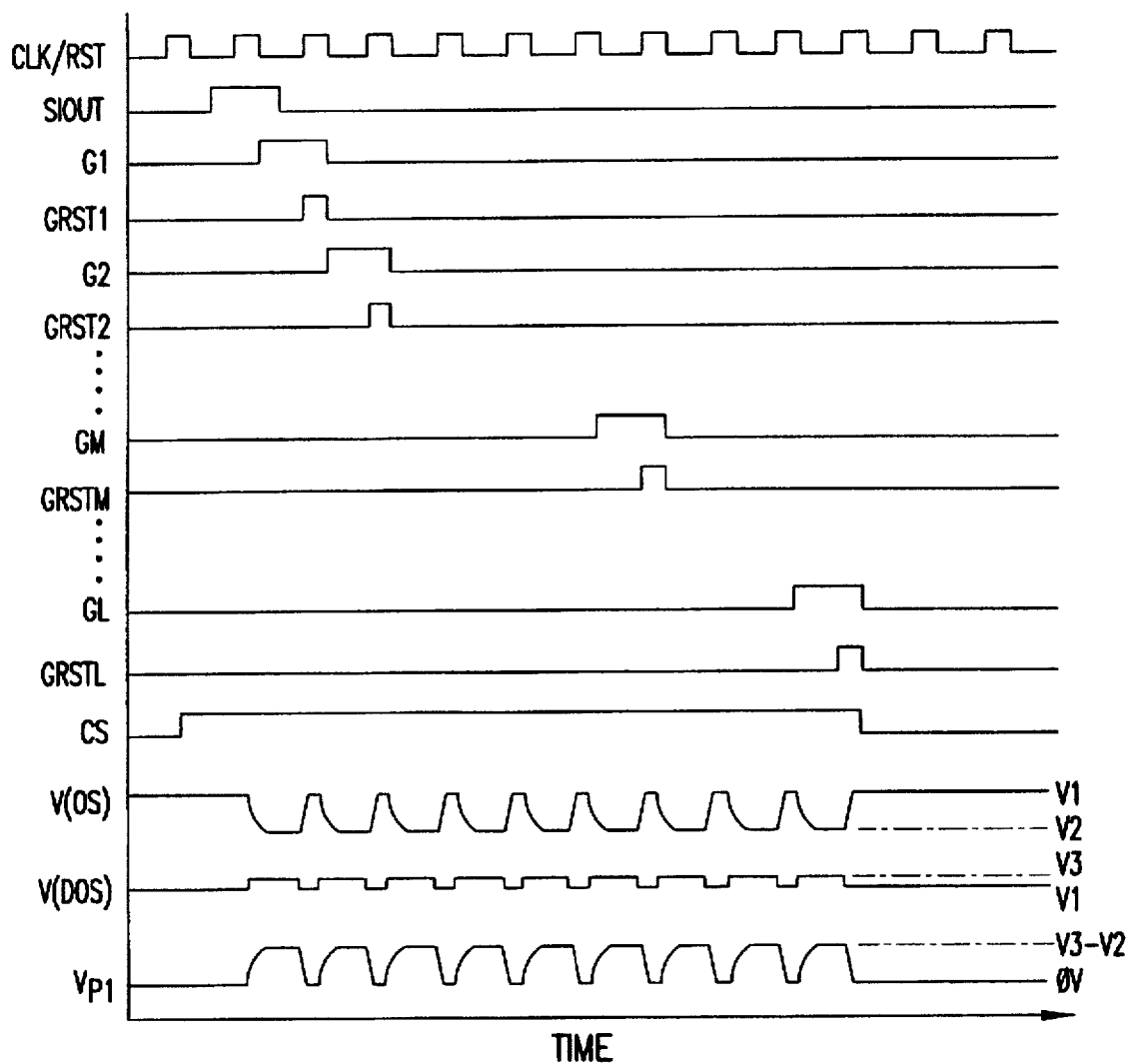
FIG. 12 is a timing diagram illustrating the operation of the contact image sensor utilizing the chip of FIG. 11.

The chip select signal CS and controlling switches SWO1 and SWO2 control the transmission of the video signals V(OS) and the reference level signals V(DOS) from output stage 126 to amplifier 130. The resulting output signal $V_{P1}$ is the value of V(DOS) minus V(OS), which is the voltage that would correspond to the electrical charge produced by the sensed light. This is illustrated in the timing diagram of FIG. 12 for the block circuit diagram of FIG. 11.

Figure 13:
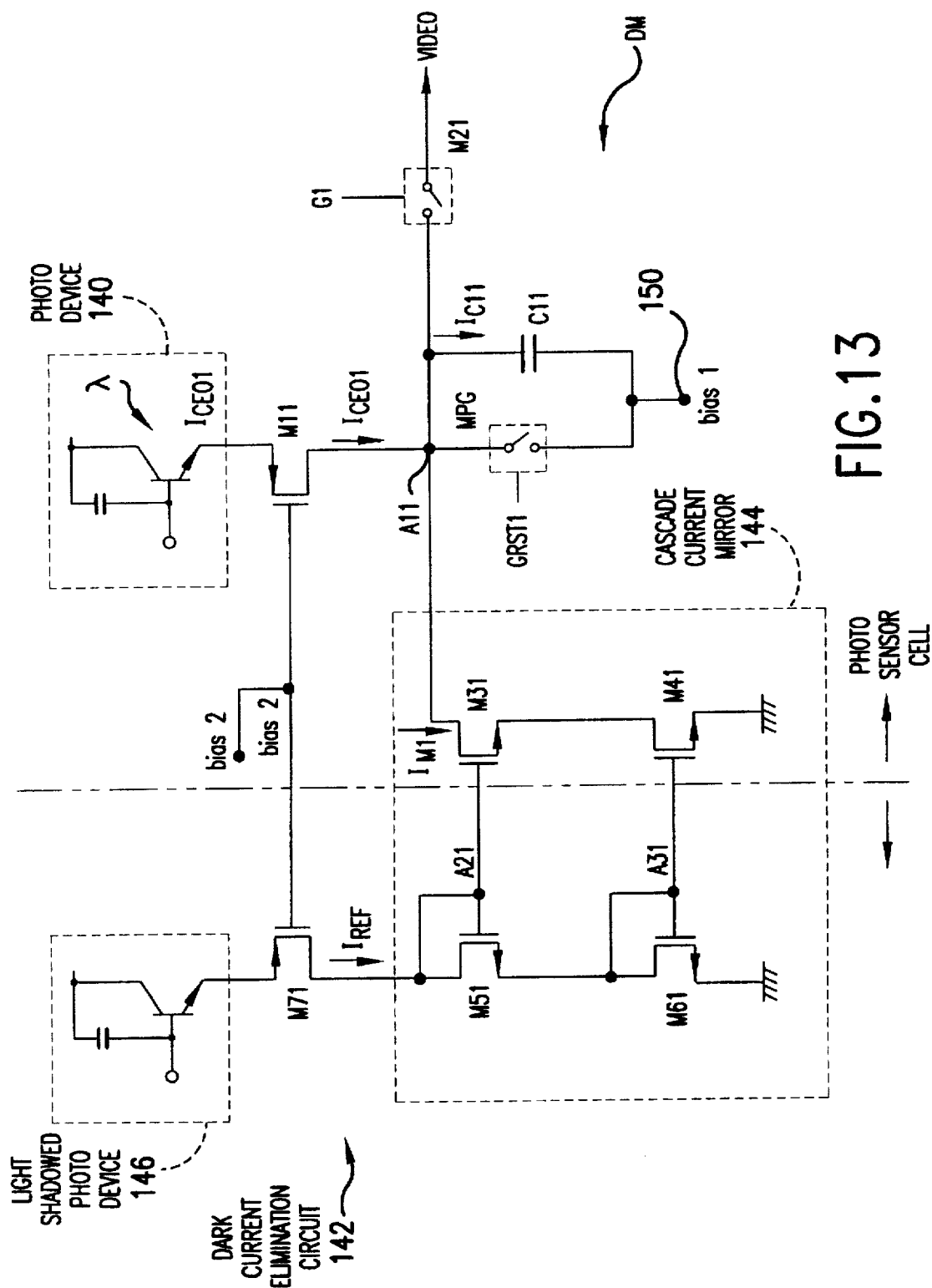
FIG. 13 is a block circuit diagram of a third embodiment of a photodevice module according to the present invention including a dark current elimination circuit.

The third embodiment of a photodevice module DM according to the present invention is illustrated in FIG. 13, which also includes a dark current elimination circuit 142. The photodevice shown in the dotted box 140 is a phototransistor. Electrical charges created by light stimulation take the form of electrical current $I_{CEO1}$ which constantly flows through MOSFET device or transmission gate M11 because of the biasing by "bias 2" and, after being adjusted by the dark current elimination circuit 142 described below, becomes current $I_{C11}$ which charges the terminal A11 of capacitor C11.

The dark current elimination circuit 142 includes a current mirror 144 and a photodevice 146 which, in this case, is also a phototransistor. The photodevice 146 is completely shielded or covered from light, so that the dark current $I_{REF}$ generated by it should approximate the expected dark current that is generated by the photodevices 140. This dark current $I_{REF}$ is used as a dark current reference signal for adjusting the signals output by the other photodevices 140. The dark current $I_{REF}$ constantly flows through MOSFET device or transmission gate M71 because M71 is constantly biased by the "bias 2". The current mirror 144 includes MOSFET devices M31, M41, M51 and M61, so that $I_{REF}$ flowing through MOSFET devices M51 and M61 will cause a corresponding current $I_{M1}$ to flow through MOSFET devices M31 and M41 representing the dark current that needs to be subtracted or adjusted from $I_{CEO1}$ In other words, $I_{C11} = I_{CEO1} - I_{M1}$ Thus, the charging current $I_{C11}$ of capacitor C11 approaches the actual value of the signals since the dark current component $I_{M1}$ has been removed.

When the shift register output signal G1 turns on the photodevice switch M21, the video signal held at terminal A11 in the form of electrical voltage V(VIDEO1) is immediately output to the video lines. The voltage V(VIDEO1) would be equal to the voltage V(BIAS 1) of "bias 1"150 plus (i.e., added to) the voltage V(A 11) generated by capacitor C11 due to the current $I_{C11}$. During the time when the signal G1 is high, output signal GRST1 turns on reset switch MPG1 to reset the signal at both ends of the capacitor C11, including the terminal A11, to the voltage V(BIAS 1) for use with the next signal.

Figure 14:
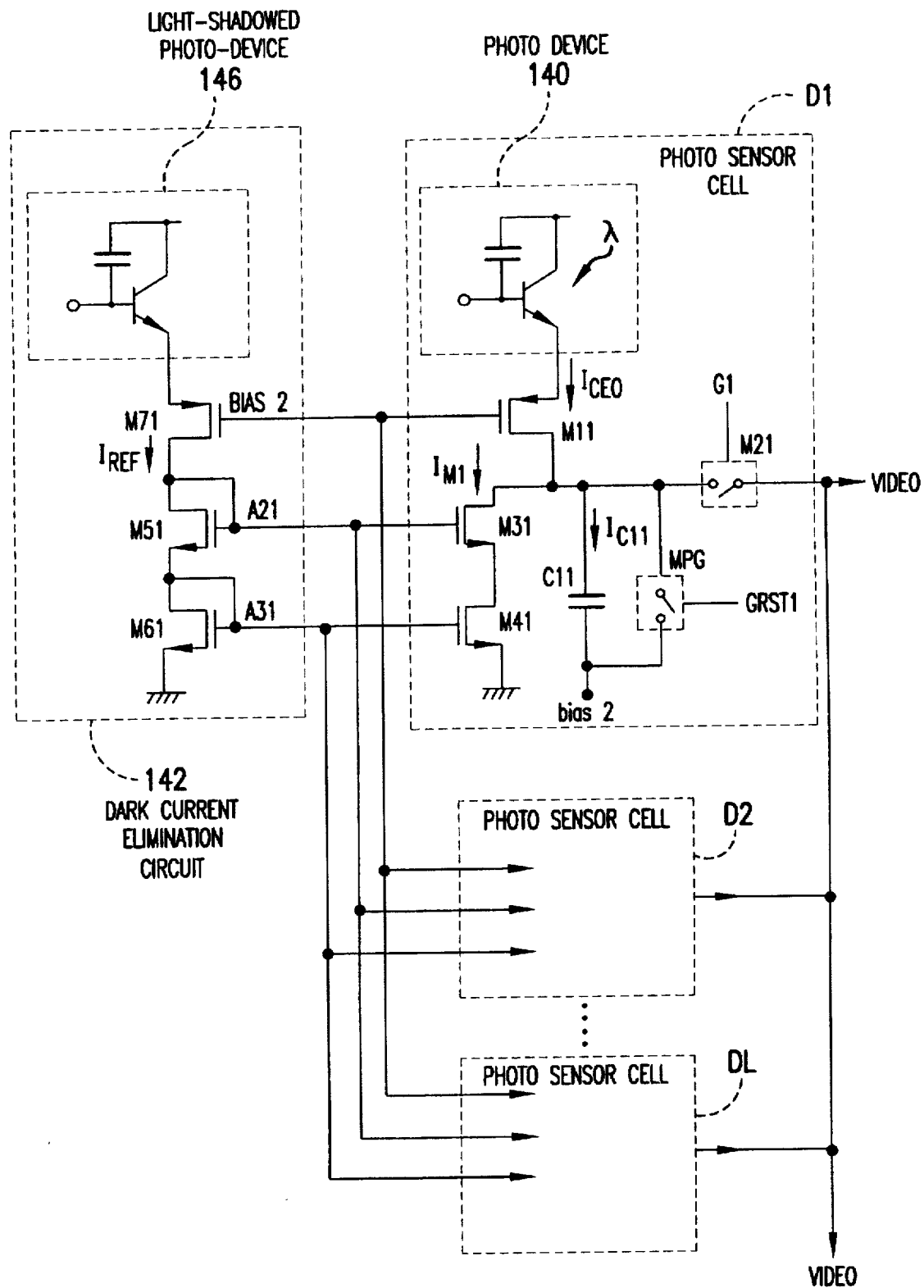
FIG. 14 is a block circuit diagram illustrating how the dark current elimination circuit of FIG. 13 is connected to a plurality of the photodevice modules of FIG. 13.

FIG. 14 illustrates that the dark current elimination circuit 142 can be connected to all the photodevice modules DM to create current mirrors thereat that are used to remove the dark current component from the electrical currents of these photodevice modules DM.

Figure 15:
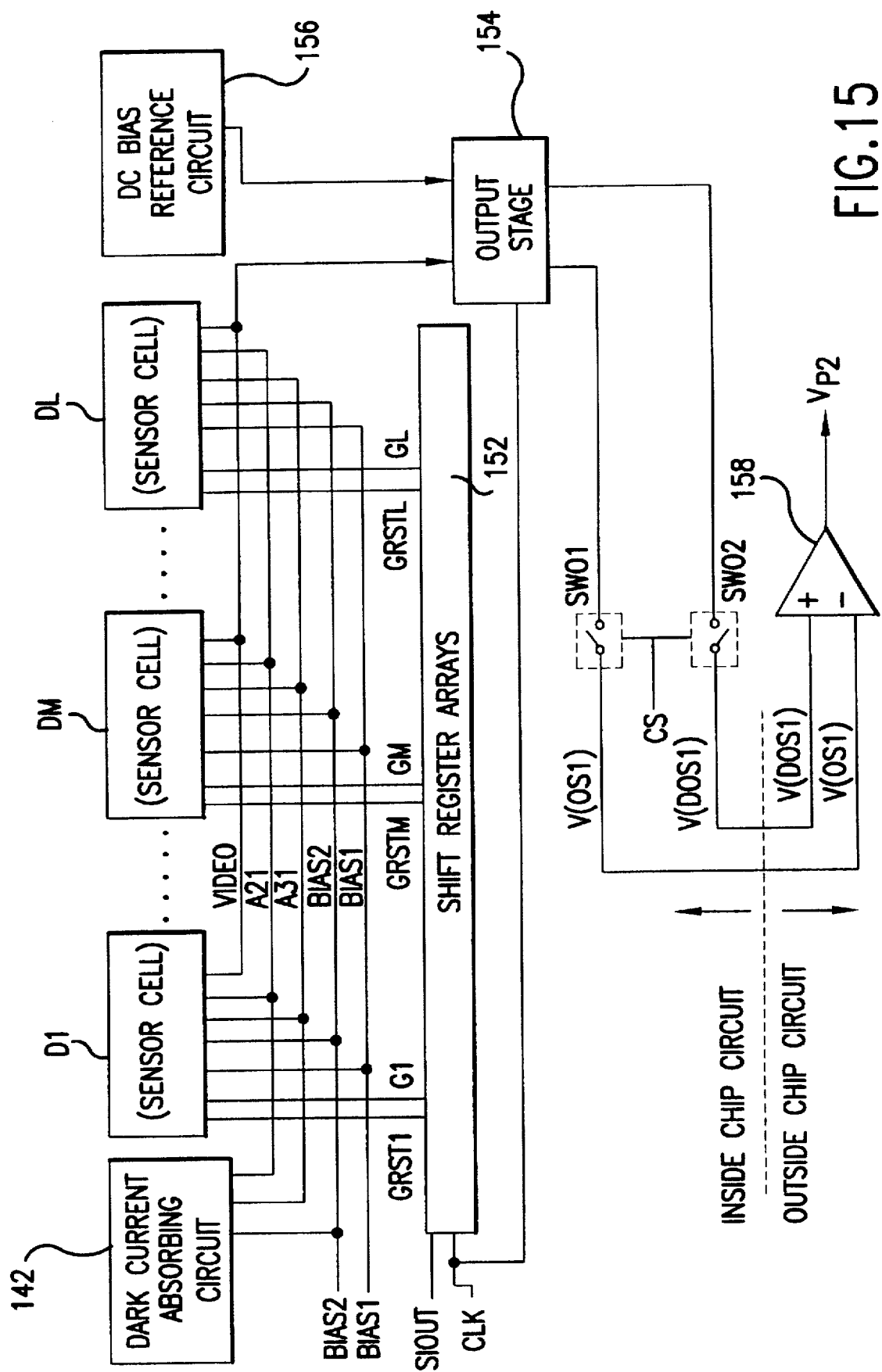
FIG. 15 is a block circuit diagram of a contact image sensor chip including a plurality of the photodevice modules of FIG. 13.
Figure 16:
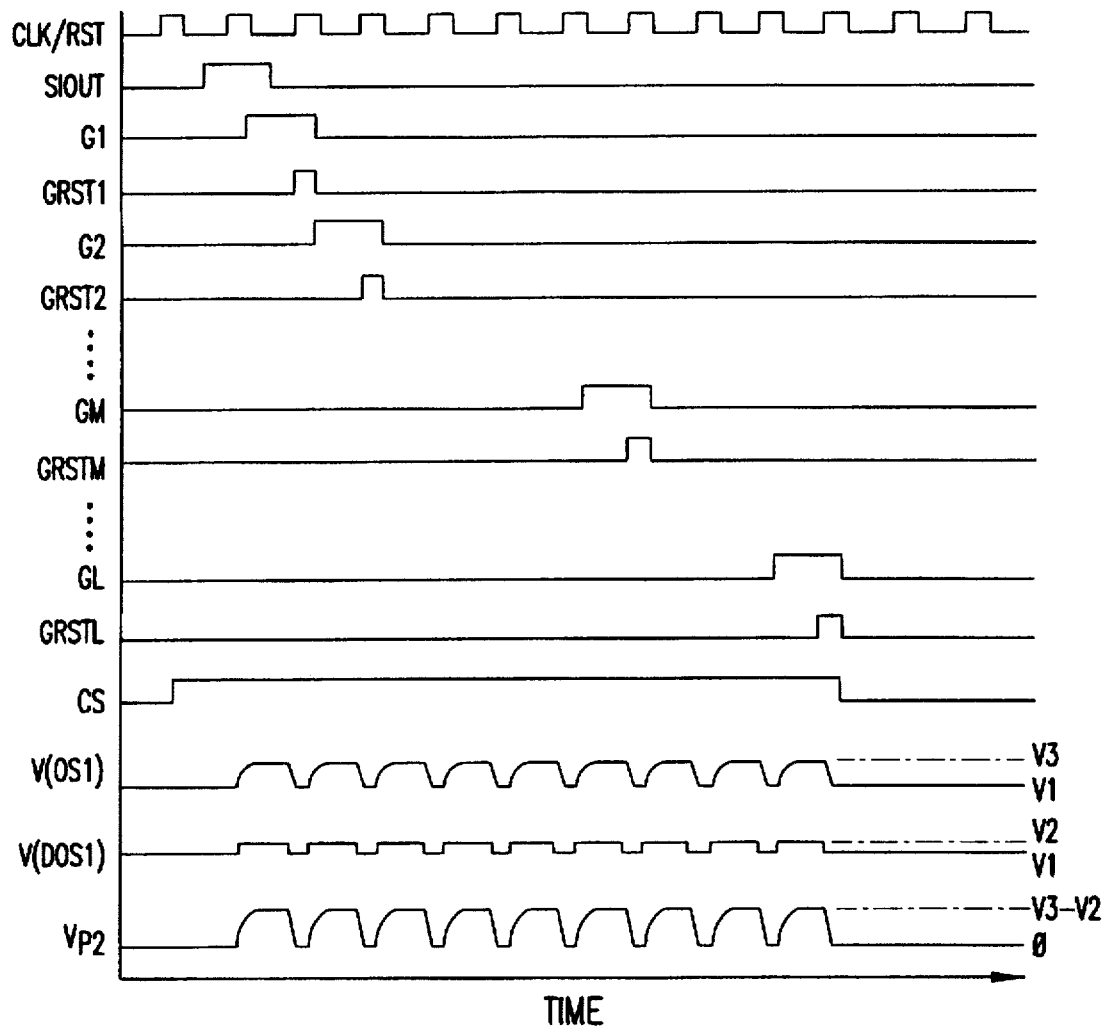
FIG. 16 is a timing diagram illustrating the operation of the contact image sensor utilizing the chip of FIG. 15.

FIG. 15 is the block circuit diagram illustrating how the photodevice modules DM of FIG. 13 combine to read or process light signals which are received. The shift register array 152 sequentially outputs signals G1, G2, ....., GM, . . . , GL to sequentially turn on switches M21 in the photodevice modules D1, D2, ...., DM, ...., DL, thereby sequentially outputting the voltage V(VIDEO 1) held at terminal A11 in these photodevice modules D1, D2, ...., DM, ..., DL on to the video line to the output stage 154 as the output signal V(OS1). A DC bias reference circuit 156, which performs the same function as DC bias reference circuit 128, is also connected to the output stage 154 to provide a reference signal V(DOS 1) that is of the same level as the reset level of signal V(OS 1). The chip select signal CS and controlling switches SWO11 and SWO21 control the transmission of the video signal V(OS 1) and the reference level signal V(DOS 1) from output stage 154 to amplifier 158. The resulting output signal $V_{P2}$ is the value of V(OS1) minus V(DOS 1), which is the voltage that would correspond to the electrical charge produced by the sensed light. This is illustrated in the timing diagram of FIG. 16 for the block circuit diagram of FIG. 15.

Thus, in each of the embodiments of the photodevice module according to the present invention, the electrical current created by light stimulation is constantly flowed by the photodevice to another part of the photodevice module, then immediately converted into electrical voltage and held at a terminal of a capacitor within the photodevice module. Therefore, when the shift register output signal G1 turns on the shift register output switch, the video signal held at the terminal in the form of electrical voltage is immediately output to the video lines. This avoids the problems caused by the time needed to transfer electrical charges during the reading time. In addition, a dark current elimination circuit having a light-shielded photodevice produces a dark current reference signal $I_{REF}$ which is used to adjust the electrical charge created by the light stimulation. As a result, the photodevice modules of the present invention provide improved frequency response and more accurate output video signals, while minimizing image lag and the effect of dark current.

While the description above refers to particular embodiments of the present invention, it will be understood that many modifications may be made without departing from the spirit thereof. As a non-limiting example, those skilled in the art will appreciate that a dark current elimination circuit similar to circuit 142 of FIG. 13 can be used with the photodevice modules PM and SM of FIGS. 7 and 10, respectively. Such a dark current elimination circuit would also utilize a current mirror to achieve the dark current elimination.

What is claimed is:

1. A contact image sensor having a video line for transmitting video signals and a photodevice module adapted to transmit an electrical charge representing a video signal to the video line upon receipt of light having a level of intensity, the photodevice module comprising:

a photodevice for producing an electrical charge representative of the intensity of received light;

a voltage terminal;

a voltage source providing a bias voltage;

a capacitor having a first end coupled to the voltage source and a second end forming the voltage terminal;

a current mirror circuit coupled to the photodevice and the voltage terminal, the current mirror circuit isolating the capacitor from the photodevice; and a switch coupled to the voltage terminal for switching on the photodevice module to transmit the electrical voltage at the voltage terminal as the video signal.

2. The contact image sensor of claim 1, wherein the photodevice module further comprises a reset switch coupled to the voltage terminal for resetting the voltage thereat to the bias voltage after transmission of the electrical voltage thereat.

3. The contact image sensor of claim 2, wherein the reset switch resets the voltage at the voltage terminal without resetting the photodevice.

4. The contact image sensor of claim 2, further comprising a bias reference circuit for providing a reference voltage corresponding to the bias voltage.

5. The contact image sensor of claim 4, further comprising an output circuit for receiving the video signal and the reference voltage, and for outputting an output signal which has subtracted the video signal from the reference voltage.

6. The contact image sensor of claim 1, wherein the current mirror circuit isolates the switch from the photodevice.

7. The contact image sensor of claim 1, wherein the photodevice continuously provides to the current mirror circuit the electrical charge representative of the intensity of received light.

8. A contact image sensor having a video line for transmitting video signals and a photodevice module adapted to output an electrical charge representing a video signal to the video line upon receipt of light having a level of intensity, the photodevice module comprising:
   a photodevice continuously producing an electrical charge representative of the intensity of received light;
   a voltage terminal coupled to the photodevice;
   a voltage source providing a bias voltage;
   a capacitor having a first end coupled to the voltage source and a second end forming the voltage terminal, the voltage terminal holding electrical voltage converted from the electrical charge and separating the capacitor from the photodevice; and
   a switch coupled to the voltage terminal for switching on the photodevice module to transmit the electrical voltage at the voltage terminal which represents the video signal.

9. The contact image sensor of claim 8, wherein the photodevice module further comprises a reset switch coupled to the voltage terminal for resetting the voltage thereat.

10. The contact image sensor of claim 9, wherein the reset switch resets the voltage at the voltage terminal without resetting the photodevice.

11. The contact image sensor of claim 9, wherein the photodevice module further comprises a source for providing a bias voltage, wherein the voltage level at the voltage terminal corresponds to the bias voltage plus the voltage induced across the capacitor.

12. The contact image sensor of claim 11, further comprising a bias reference circuit for providing a reference voltage corresponding to the bias voltage.

13. The contact image sensor of claim 12, further comprising an output circuit for receiving the video signal and the reference voltage, and for outputting an output signal which has subtracted the reference voltage from the video signal.

14. The contact image sensor of claim 8, further comprising a dark current elimination circuit for eliminating a dark current component from the electrical charge, the dark current elimination circuit comprising a light-shielded photodevice, and the contact image sensor further comprising a current mirror circuit coupled to the light-shielded photodevice and the photodevice of the photodevice module.

15. The contact image sensor of claim 8, further comprising an amplifier coupled to the voltage terminal for amplifying the video signal prior to transmission thereof.

16. The contact image sensor of claim 8, wherein the voltage terminal separates the switch from the photodevice.

17. A method for transmitting video signals from a plurality of photodevice modules for subsequent output by a contact image sensor device, comprising the steps of:
   (a) providing a plurality of photodevice modules, each comprising a photodevice, a voltage terminal and a shift register switch;
   (b) providing a contact image sensor device comprising a video line and a shift register array adapted to generate a shift register output signal to turn on the photodevice modules in a sequential manner to allow for transmission of video signals therefrom to the video line;
   (c) directing light having a level of intensity to the photodevice of one of the photodevice modules;
   (d) generating a continuous electrical charge from the photodevice that is representative of the level of intensity of the light received by the photodevice;
   (e) converting the electrical charge to an electrical voltage;
   (f) holding the electrical voltage at the voltage terminal;
   (g) generating the shift register output signal to turn on the photodevice module;
   (h) transmitting the electrical voltage held at the voltage terminal as a video signal to the video line; and
   (i) resetting the electrical voltage at the voltage terminal without resetting the photodevice.

18. The method of claim 17, further comprising the step of (j) biasing the voltage terminal to a bias voltage.

19. The method of claim 18, further comprising the step of (k) providing a reference voltage corresponding to the bias voltage.

20. The method of claim 19, further comprising the step of (l) subtracting the reference voltage from the electrical voltage transmitted to the video line.

21. The method of claim 19, further comprising the step of (l) subtracting the electrical voltage transmitted to the video line from the reference voltage.

22. The method of claim 17, wherein step (d) further includes the step of amplifying the generated electrical charge.

23. The method of claim 17, wherein step (d) further comprises the step of removing a dark current component from the electrical charge.

24. The method of claim 23, wherein the step of removing a dark current component from the electrical charge comprises the following steps:
   (i) providing a light-shielded photodevice for generating a continuous dark current;
   (ii) coupling the light-shielded photodevice and the photodevice module to a current mirror circuit;
   (iii) removing a component of the electrical charge from the photodevice of the photodevice module that corresponds to the dark current generated by the light-shielded photodevice.

25. The method of claim 17, wherein step (h) further includes the step of amplifying the video signal.

26. An image sensing device, comprising:
   at least one photodevice for generating an electrical charge representative of an intensity of light received by the photodevice; and
   a dark current elimination circuit comprising:
      a light-shielded photodevice which produces an electrical current representative of the expected dark current; and
      a current mirror circuit coupled to the light-shielded photodevice and the at least one photodevice for removing a component of electrical charge from the electrical charge generated by the at least one photodevice that corresponds to the expected dark current.

* * * * *